May 5, 1953  H. T. WALTHER  2,637,073
METHOD FOR INJECTION MOLDING
Filed April 18, 1950
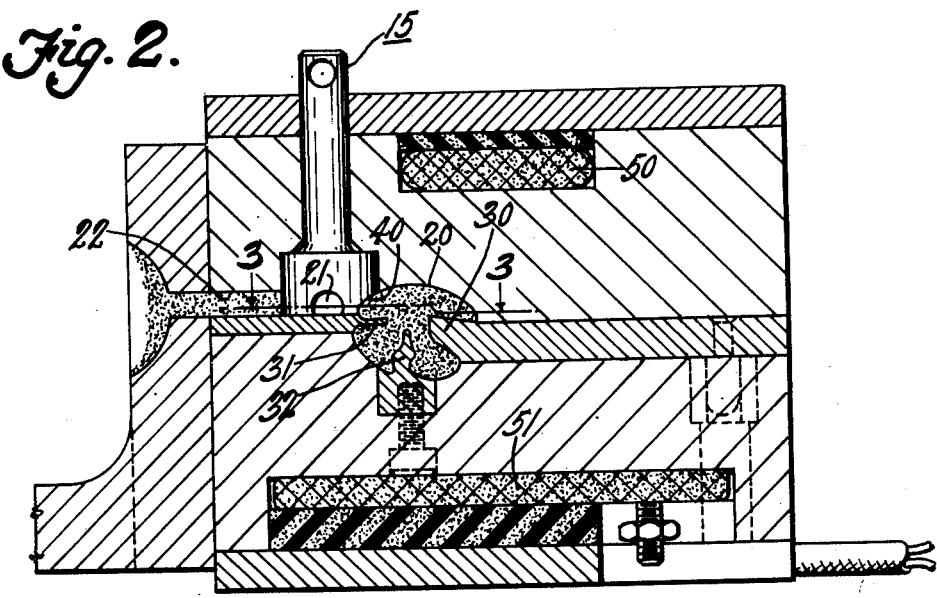
Fig. 2.
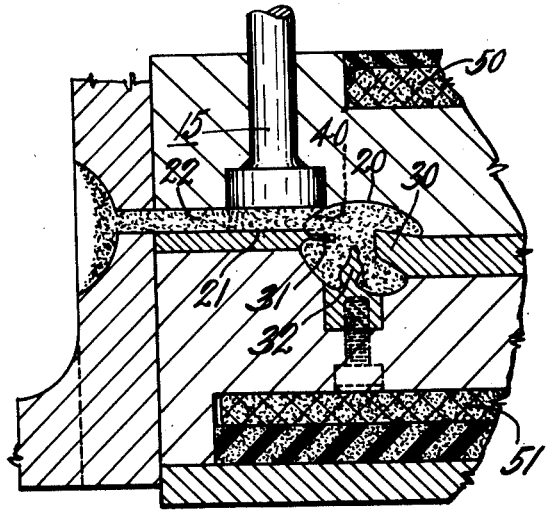
Fig. 1.
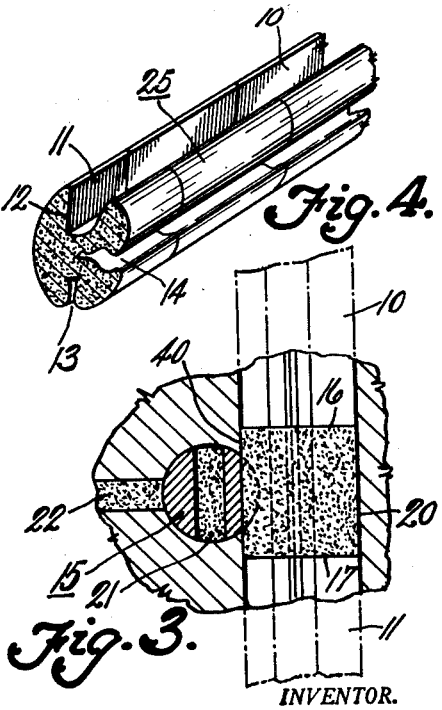
Fig. 4.
Fig. 3.
INVENTOR.
HOWARD T. WALTHER
BY
Willits, Hardman & Fehr
his ATTORNEYS Patented May 5, 1953

2,637,073

UNITED STATES PATENT OFFICE 2,637,073

METHOD FOR INJECTION MOLDING

Howard T. Walther, Dayton, Ohio, assignor to General Motors Corporation, Detroit, Mich., a corporation of Delaware Application April 18, 1950, Serial No. 156,624

2 Claims. (Cl. 18—59)

1

This invention relates to a method for making an integral joint between meeting ends of two strips of rubber or rubber-like material, such as the rubber strips now in general use for weather sealing the joint between an automobile windshield or glass window and its surrounding rigid support. Such integral joints are particularly useful at the corners of the windshield or window where it is desired to provide a mitered corner in the strips.

An object of this invention is to provide a method of injecting vulcanizable rubber or rubber-like compound into a closed mold cavity into which the two ends of the strips to be joined together project and form part of the bounding areas of said cavity, and thereafter curing the injected material to provide a newly molded corner or other section in integral continuity with the original strips.

Another object is to provide an improved method of injection molding which eliminates the usual "runner" or other inequalities on the final molded article at the point where the material was injected into the mold cavity.

A feature of this invention is the cut-off valve for the injected material, which cut-off valve is located to substantially intersect the normal molding surface of said cavity and so arranged that when said valve is moved to close the flow of injected material into said cavity a specially designed portion of said valve completes the continuity of the cavity walls. Thus molded necks or "runners" on the molded article are prevented and a proper continuous surface is provided at the injection inlet. Since the aperture in the cut-off valve thru which the injected material enters to fill the mold cavity is distinct from that molding surface on the cut-off valve which forms part of the cavity walls, said molding surface may be made to provide any shape that may be desired in the cavity walls at that particular area.

Further objects and advantages of the present invention will be apparent from the following description, reference being had to the accompanying drawings wherein a preferred embodiment of the present invention is clearly shown.

In the drawings:

Fig. 1 is a vertical section thru the apparatus of this invention and shows the mold cavity being filled with vulcanizable material thru the cut-off valve aperture.

Fig. 2 is similar to Fig. 1 but shows the cut-off valve turned to close the injection aperture and at the same time to form part of the irregular surface of the mold cavity walls.

2

Fig. 3 is a fragmentary horizontal section on line 3—3 of Fig. 2, and shows in dash-dot lines the two end portions of the rubber strips which are being integrally joined together by vulcanization of the injected material.

Fig. 4 is a perspective view of the joined portions of the flexible rubber weather sealing strip after vulcanization and removal from the mold.

Similar reference characters refer to similar parts thruout the drawings.

The two flexible rubber strips 10 and 11 whose surfaces are to be integrally joined together are here illustrated as having three longitudinal grooves therein. Groove 12 is of sufficient width and depth to receive the glass windshield edge which is to be later inserted therein. Groove 13 is of the desired width and depth to receive the sheet metal edge to be later inserted therein. Groove 14 is of the desired irregular section so that when filled with a wedging strip of correct cross section will press the adjacent legs of the rubber body tightly against the glass edge in groove 12 and metal edge in groove 13, and so provide a weather-proof seal between said glass and metal edges. Similar sealing strips are now well known and are shown and described in Patent #2,189,138 issued February 6, 1940, F. R. Eichner. By means of this invention the ends of two such sealing strips are accurately integrally joined together with the grooves 12, 13, and 14 continuous thru the joint section as best shown in Fig. 4. The two end portions of strips 10 and 11 are inserted in the mold cavity 20 of a divided mold so that said end portions in effect form inserts in said mold cavity, the grooves 12, 13 and 14 therein being filled with suitable adjacent parts of the mold or otherwise, so that the mold cavity 20 will be fully closed around said strip ends. The end faces 16 and 17 of the strips 10 and 11 are spaced apart on opposite sides of the injection valve 15, as shown in Fig. 3. Now when injection valve 15 is turned at right angles to its position shown in Fig. 3 its small extrusion aperture 21 will lead directly from the injection aperture 22 in the mold body to the closed mold cavity 20, as clearly shown in Fig. 1. The mold cavity 20 is then filled under pressure with suitable vulcanizable material such as an uncured rubber compound by injecting the material thru apertures 22 and 21. The mold part 30 projects into cavity 20 so as to form the wide groove 12 in the new joint section indicated by 25 in Fig. 4. The mold part 31 projects into cavity 20 so as to form the desired narrow groove 13 in the new joint section 25. The mold part 32 projects into cavity 20 so as to form the irregular wedging strip groove 14 in the new joint section 25. These mold parts 30, 31 and 32 preferably extend into their corresponding aligned grooves 12, 13 and 14 in the adjacent end portions 10 and 11 so that the mold cavity 20 will be fully closed around the end faces 16 and 17 of the two strip end portions 10 and 11, as described above.

After mold cavity 20 is filled with the vulcanizable material the valve 15 is turned thru 90° as shown in Fig. 2, to close off the injection aperture 21 and to bring other portions of valve 15 into immediate contact with mold cavity 20. Such other portions of valve 15 are cut away to provide a specially designed molding surface 40 thereon which in the form illustrated is precisely aligned with corresponding surfaces of the strip end portions 10 and 11 (see Figs. 2 and 3). Also valve 15 is so accurately fitted and rigidly supported within its recess in the mold body that its contour surface 40 can successfully withstand the internal pressure within cavity 20 during vulcanization of the injected material therein. Thus the molding surface 40 on valve 15 provides an effective rigid molding surface for the cavity 20 during vulcanization, and at the same time obviously eliminates any neck or "runner" at the injection inlet in the final molded joint 25.

With the mold parts in position as shown in Fig. 2, heat is applied to the mold in any suitable manner to cure the material in cavity 20 and simultaneously bond it to the end faces 16 and 17 in a well known manner. The mold here illustrated is heated by two suitable electric heating elements 50 and 51 so embedded in suitable recesses in the two mold halves as to properly apply vulcanizing temperature to the material in cavity 20.

In the form shown in the drawings the two strips 10 and 11 are shown extending in direct alignment for the sake of clearness of illustration, but it is obvious that the principles of this invention remain the same when the two strips are to be joined together to form a mitered corner at any angle between 180° and 90° simply by designing the mold parts accordingly. Regardless of the angle of any such mitered corners the cut-off valve 15 is located to intersect the normal mold cavity somewhere between the two end faces of the strips to be integrally joined together by the newly molded corner. Thus in all cases the valve 15 will eliminate any injection "runner" at the cavity inlet thru which the injected material enters the mold cavity. The cut-away molding surface 40 of the valve of course will be designed to conform with the next adjacent mold cavity surfaces. Obviously such cut-away molding surface of valve 15 may be suitably embossed or engraved to mold into the surface of the final article any suitable trademark or other design or lettering at such joints. This feature is particularly advantageous with such sealing strips, which are made by extruding same to the desired cross section and finally cured in long lengths without being molded in a mold. With such extruded strips any design or lettering impressed upon the surface of the strip itself must be accomplished by a separate operation.

While the embodiment of the present invention as herein disclosed, constitutes a preferred form, it is to be understood that other forms might be adopted.

What is claimed is as follows:

1. In a method of joining together endwise two flexible strips of rubber-like material, the steps comprising: inserting the two end portions of the flexible strips in a divided mold in spaced relation so that the end faces of said end portions provide areas in the bounding surface of the mold cavity, compressing the material of the inserted end portions for maintaining their spaced relation, injecting under pressure a vulcanizable compound of rubber-like material into the mold cavity thru a cut-off valve located adjacent to and intersecting the bounding surface of the mold cavity, then moving the cut-off valve to close the injection passages at said bounding surface of the mold cavity and concomitantly forming a closed molding surface continuous with and shaped to blend into said bounding surface of the mold cavity, then vulcanizing the injected material under heat and pressure.

2. In a method of molding and curing a plastic rubber-like material injected between two spaced portions to be joined, the steps comprising: providing a closed mold cavity having an injection inlet leading thereinto, inserting and holding two end portions in spaced relation within said cavity, injecting under pressure the uncured compound of rubber-like material into the mold cavity between two end portions and thru a cut-off valve located at said inlet and intersecting the bounding surface of the cavity, then moving the cut-off valve to close the injection inlet and concomitantly forming a closed molding surface continuous with and shaped to blend into bounding surface of the mold cavity, then curing the injected material in the fully closed mold cavity under heat and pressure for forming a joint portion between said two end portions wherein said end portions are molded to the desired configuration.

HOWARD T. WALTHER.

References Cited in the file of this patent

UNITED STATES PATENTS

| Number | Name | Date |
| --- | --- | --- |
| 1,174,049 | Brand et al. | Mar. 7, 1916 |
| 1,674,387 | Campbell | June 19, 1928 |
| 2,178,410 | Tegarty | Oct. 31, 1939 |
| 2,266,129 | Tegarty | Dec. 16, 1941 |
| 2,287,163 | Bishop | June 23, 1942 |
| 2,513,808 | Lodge | July 4, 1950 |